(12) United States Patent
Kakadia et al.

(10) Patent No.: US 9,036,589 B2
(45) Date of Patent: May 19, 2015

(54) TRANSMITTING DATA FLOWS VIA PARTICULAR CONNECTION POINTS ACCESSIBLE VIA ONE OR MORE ACCESS POINTS

(71) Applicant: Verizon Patent and Licensing, Inc., Basking Ridge, NJ (US)

(72) Inventors: Deepak Kakadia, Union City, CA (US); Thomas H. Tan, San Jose, CA (US); Arda Aksu, Martinez, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 105 days.

(21) Appl. No.: 13/929,480

(22) Filed: Jun. 27, 2013

(65) Prior Publication Data

US 2015/0003335 A1    Jan. 1, 2015

(51) Int. Cl.
*H04W 40/02* (2009.01)
*H04L 12/707* (2013.01)
*H04L 12/54* (2013.01)

(52) U.S. Cl.
CPC .............. *H04W 40/02* (2013.01); *H04L 45/24* (2013.01); *H04L 12/5689* (2013.01)

(58) Field of Classification Search
USPC .......................... 370/310–350, 252, 464–465
See application file for complete search history.

(56) References Cited

U.S. PATENT DOCUMENTS

| | | | | |
|---|---|---|---|---|
| 6,778,517 | B1 * | 8/2004 | Lou et al. | 370/338 |
| 6,904,024 | B1 * | 6/2005 | Boch et al. | 370/310.1 |
| 7,969,910 | B2 * | 6/2011 | Barak et al. | 370/254 |
| 2001/0044305 | A1 * | 11/2001 | Reddy et al. | 455/436 |
| 2002/0025817 | A1 * | 2/2002 | Karino et al. | 455/445 |
| 2003/0169719 | A1 * | 9/2003 | Isobe et al. | 370/338 |
| 2004/0252708 | A1 * | 12/2004 | Mizukoshi | 370/408 |
| 2005/0068970 | A1 * | 3/2005 | Srikrishna et al. | 370/400 |
| 2006/0215582 | A1 * | 9/2006 | Castagnoli et al. | 370/254 |
| 2009/0046602 | A1 * | 2/2009 | Mahany et al. | 370/255 |
| 2009/0180396 | A1 * | 7/2009 | Kish | 370/254 |
| 2012/0224474 | A1 * | 9/2012 | Beser | 370/228 |

* cited by examiner

*Primary Examiner* — Warner Wong

(57) ABSTRACT

A first network device may receive an instruction to transmit a data flow and select a particular second network device based on a selection rule. The particular second network device providing may provide to an external network. The first network device may identify a path to the particular second network device. The particular path may include one or more third network devices that are different from the first network device. The first network device may provide the data flow to the particular second network device via the path to cause the particular second network device to transmit the data flow towards a destination device.

20 Claims, 8 Drawing Sheets

Adjacent Device Information
510

Device ID: AP-1

| Adjacent Devices | Latency | Bandwidth |
|---|---|---|
| AP-2 | 50 ms | 2 Mbps |
| AP-5 | 100 ms | 3 Mbps |

Aggregate Adjacent Device Information
520

| Origin | Adjacent Device | Latency | Bandwidth |
|---|---|---|---|
| AP-1 | AP-2 | 50 ms | 4 Mbps |
| AP-1 | AP-5 | 100 ms | 3 Mbps |
| AP-2 | AP-4 | 75 ms | 7 Mbps |
| AP-2 | AP-3 | 200 ms | 1.5 Mbps |
| AP-3 | CP-1 | 20 ms | 2.3 Mbps |
| AP-4 | CP-2 | 30 ms | 1.2 Mbps |
| AP-4 | AP-5 | 30 ms | 3.3 Mbps |
| AP-5 | CP-1 | 20 ms | 4.5 Mbps |

Path Table
530

| Origin | Destination | External IP | Path | Path Latency | Path Bandwidth |
|---|---|---|---|---|---|
| AP-1 | CP-1 | 1.1.1.1 | AP-2, AP-3, CP-1 | 270 ms | 1.5 Mbps |
| AP-1 | CP-1 | 1.1.1.1 | AP-5, CP-1 | 120 ms | 4.5 Mbps |
| AP-1 | CP-2 | 1.1.1.2 | AP-2, AP-4, CP-2 | 155 ms | 1.2 Mbps |
| AP-2 | CP-1 | 1.1.1.1 | AP-3, CP-1 | 220 ms | 1.5 Mbps |
| AP-2 | CP-1 | 1.1.1.1 | AP-4, AP-5, CP-1 | 125 ms | 3.3 Mbps |
| AP-2 | CP-2 | 1.1.1.2 | AP-4, CP-2 | 105 ms | 1.2 mbps |
| AP-3 | CP-1 | 1.1.1.1 | CP-1 | 20 ms | 2.3 Mbps |
| AP-4 | CP-2 | 1.1.1.2 | CP-2 | 30 ms | 1.2 Mbps |

Connection Point Selection
540

Device ID: AP-1

| Data flow Class | Connection Point |
|---|---|
| Class 1 | CP-1 |
| Class 2 | CP-2 |
| Class 3 | CP-3 |
| Class 4 | CP-4 |

Fig. 5

TRANSMITTING DATA FLOWS VIA PARTICULAR CONNECTION POINTS ACCESSIBLE VIA ONE OR MORE ACCESS POINTS

BACKGROUND

Data flows are sometimes transmitted over a network, such as a cellular network, to a data requestor, a data repository, an application server, and/or some other location. Transmitting data over the cellular network can be costly, particularly, when a provider, associated with the cellular network, provides greater network resources than is needed to transmit the data. Also, access of the cellular network via individual client devices can be costly when a service provider, associated with the cellular network, charges for cellular network access of each client device.

BRIEF DESCRIPTION OF THE DRAWINGS

FIG. 5 illustrates an example data structure that may be stored by one or more devices in the environment of FIG. 2;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may connect multiple access points, associated with a common local network, together in order to provide each of the multiple access points connectivity to an external network (e.g., an external internet protocol (IP) network). For example, the common local network may include multiple connection points that may provide the multiple access points with connectivity to the external network. As used herein, the term "external network" is to be broadly construed as an IP network and/or some other type of network that is external to a local network.

In some implementations, a particular connection point may be selected to transmit a data flow to/from a particular access point (e.g., based on a class of the data flow and/or a measure of network resources needed to transmit the data flow). For example, different connection points may enforce different transmission policies (e.g., quality of service (QoS) policies or the like) in order to provide a particular network resource when transmitting the data flow. As a result, a particular connection point may be selected to provide network resources needed to transmit the data flow without providing substantially excess network resources that may not be needed to transmit the data flow.

Figure 1:
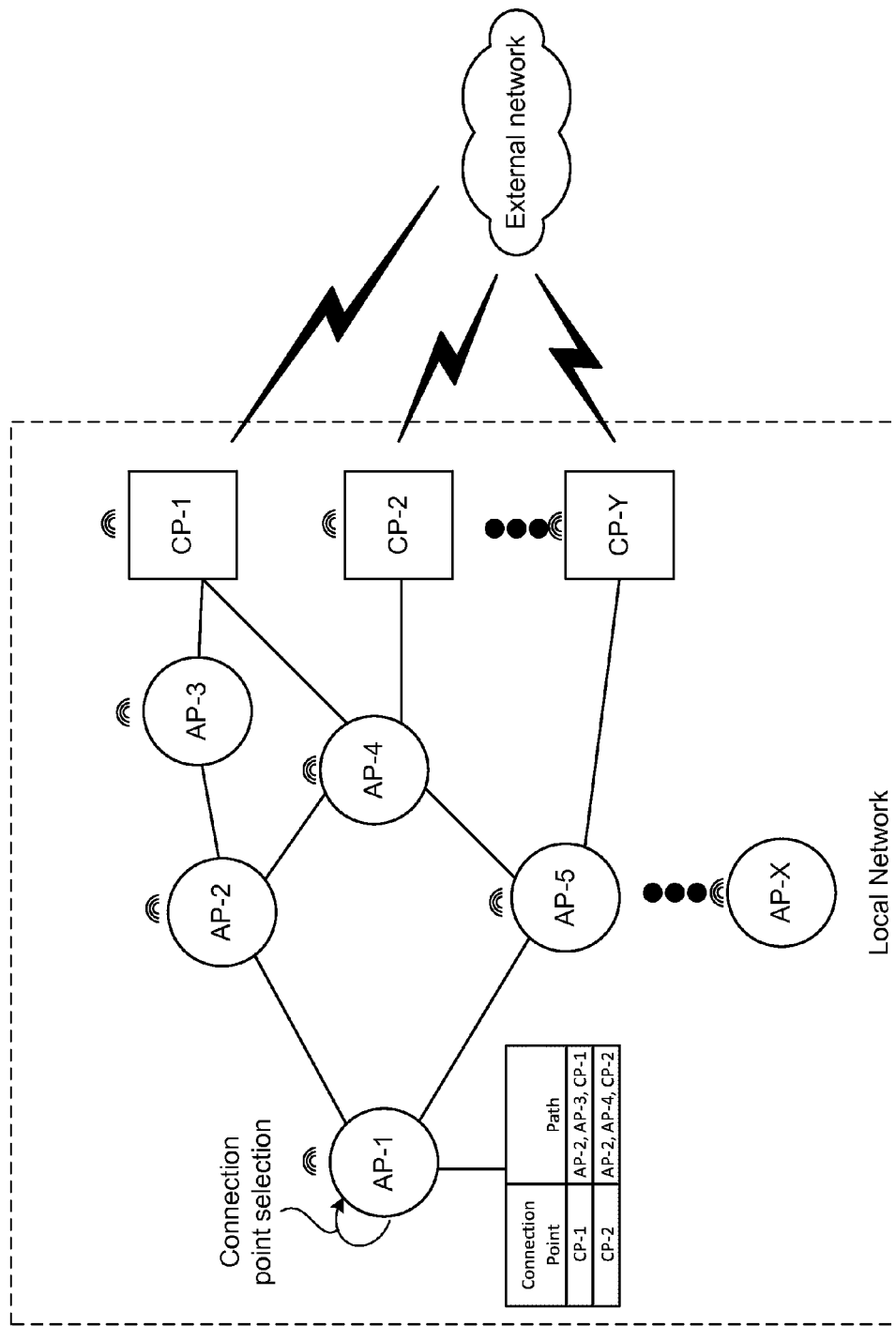
FIG. 1 illustrates an example overview of an implementation described herein.

FIG. 1 illustrates an overview of an example implementation as described herein. As shown in FIG. 1, multiple access points (e.g., AP-1 through AP-X, where X>1) may connect together and with multiple connection points (e.g., CP-1 through CP-Y, where Y>1) over a local network. In some implementations, the one or more connection points may provide access to an external network (e.g., an external network, an external cellular network, the internet, or the like) and may transmit data flows to/from the multiple access points (e.g., via the external IP network). In some implementations, the multiple access points and the multiple connection points may be geographically distributed and may each have a particular connection range.

In some implementations, the multiple access points may connect together (e.g., via wireless connections) in order to access CP-1 through CP-Y and to access the external network. For example, a particular access point may connect with an adjacent access point (e.g., an access point within a connection range of the particular access point).

In the example shown in FIG. 1, AP-1 may connect to an adjacent access point, such as AP-2 (e.g., when AP-1 and AP-2 are within connection range). AP-2 may connect to another adjacent access point, such as AP-3 (e.g., when AP-2 and AP-3 are within connection range), and AP-3 may connect to CP-1 (e.g., when AP-3 and CP-1 are within connection range). That is, AP-1 may access CP-1 when AP-1 is not in connection range of CP-1. For example, AP-1 may access CP-1 via AP-2 and AP-3.

In some implementations, an access point may discover one or more paths from the access point to a destination (e.g., to a connection point) and may store information identifying the one or more paths in a table. For example, AP-1 may store a table that identifies paths from AP-1 to CP-1 through CP-Y. In some implementations, the table may identify that, in order to access CP-1 (e.g., to access the external network to transmit a data flow), AP-1 is to transmit the data flow to AP-2, that AP-2 is to transmit the data flow to AP-3, and that AP-3 is to transmit the data flow to CP-1.

In some implementations, a particular connection point may be selected to transmit a data flow to/from a particular access point based on a class of the data flow, based on network load of the particular connection point, based on a scheduling algorithm associated with the particular connection point, and/or based on some other factor.

Based on selecting the particular connection point, the data flow can be provided to/from the particular access point via a path between the particular access point and the particular connection point (e.g., based on information stored by the table of the particular access point). As a result, a data flow may be transmitted via a particular connection point associated with a particular transmission policy. For example, an access point may transmit different classes of data flow associated with data gathered by a client device (e.g., a machine-to-machine (M2M) device or the like). Because different levels of network resources may be needed to transmit different classes of data flows, a particular connection point that provides sufficient network resources without providing substantially excess network resources may be selected to transmit the data flows, thereby conserving network resources.

In some implementations, costs to access the external network may be lower when the multiple access points access the external network via the multiple connection points than if each of the multiple access points were to access the external network directly (e.g., when a service provider of the external network charges for each device that directly accesses the external network). Further, an access point may connect to a connection point when the access point is not in connection range of the connection point (e.g., by connecting with adjacent access point(s) that provide a path to the connection point). Also, multiple access points may be concurrently provisioned when connected to an external network, thereby reducing labor and other costs associated with individually provisioning potentially tens of thousands or millions of client devices associated with the access points.

Figure 2:
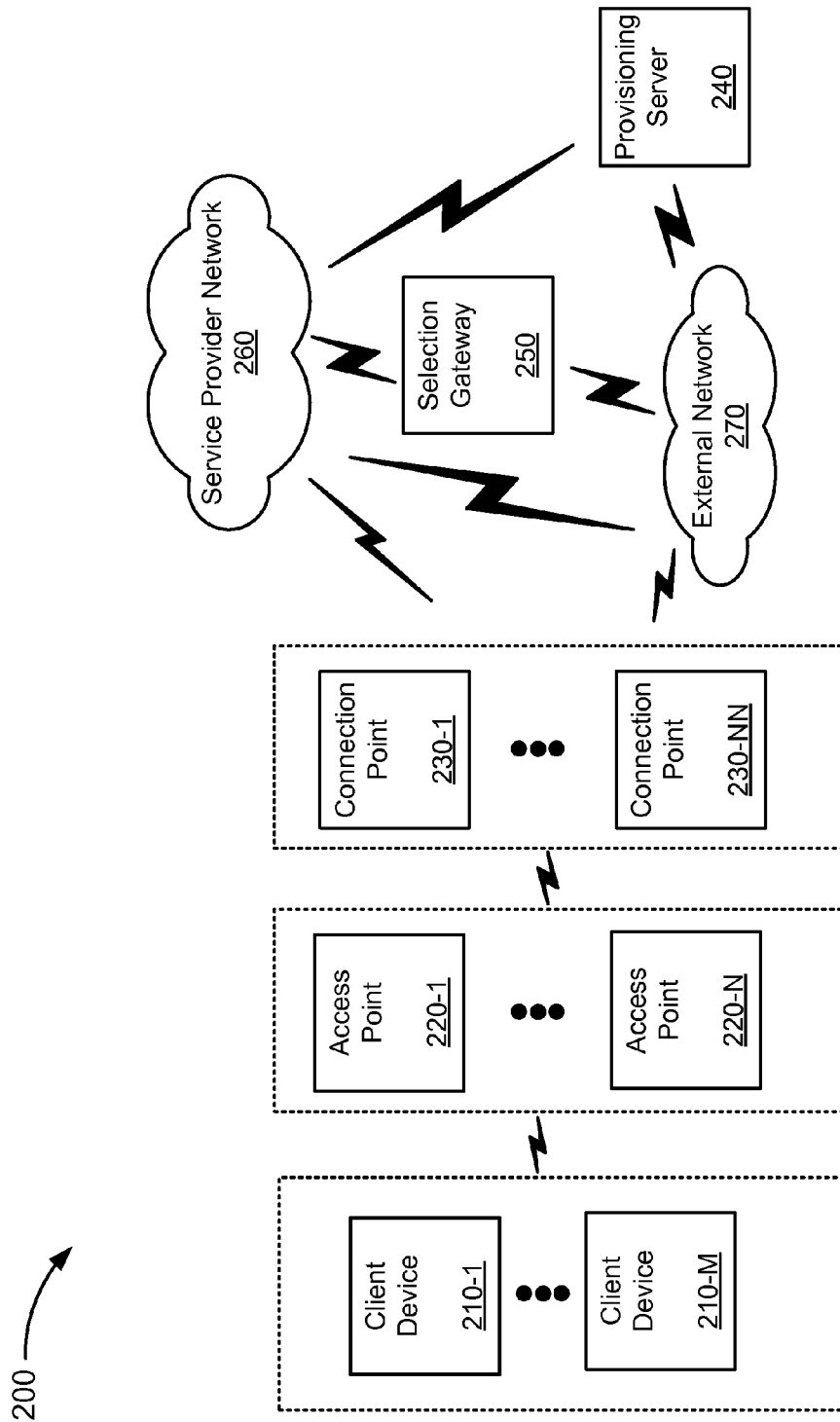
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include client devices 210-1, ..., 210-M (where M≥1), access points 220-1, ..., 220-N (where N≥1), connection points 230-1, ..., 230-NN (where NN≥1), provisioning server 240, selection gateway 250, service provider network 260, and/or external network 270.

Client device 210 may include a device capable of communicating via a network, such as external network 270. For example, client device 210 may correspond to a mobile communication device (e.g., a smart phone or a personal digital assistant (PDA)), a portable computer device (e.g., a laptop or a tablet computer), a desktop computing device, or the like.

In some implementations, client device 210 may include one or more machine-to-machine (M2M) devices capable of communicating via a network. For example, client device 210 may include a network device (e.g., a modem, a switch, a gateway, etc.), a sensing device, a processing device, a metering device, an audio/video capturing device, and/or some other type of device. In some implementations, client device 210 may gather data (e.g., temperature measurements, resource usage measurements, motion detection, object detection, facility intrusion detection, audio/video related data, etc.), may include a processing device to process the data to form processed data (e.g., via an application implemented on client device 210), and/or a network device to provide a data flow (including the processed data) towards an application device, another client device 210, and/or some other destination.

In some implementations, client device 210 may provide a control instruction (e.g., an instruction to adjust a sensor position/configuration and/or some other type of instruction) to another client device 210. In some implementations, a first client device 210 may be used to access data gathered by a second client device 210 and/or to send a control instruction to the second client device 210.

In some implementations, client device 210 may include an application device. For example, a first client device 210 may receive data gathered by a sensor device of a second client device 210, and may perform a task based on the data. For example, the first client device 210 may perform a data analysis based on the data, such as a temperature trends analysis, an inventory analysis, a sales trend analysis, etc. In some implementations, client device 210 may include another type of device that gathers, stores, processes, and/or transmits data.

In some implementations, client device 210 may transmit/receive different classes of data flows. For example, client device 210 may transmit/receive video class data flows (e.g., relating to video content captured by a camera of client device 210), text class data flows (e.g., relating to metering/sensor data captured by client device 210), audio class data flows (e.g., relating to audio content captured by a microphone of client device 210), and/or some other class of data flows.

Access point 220 may include a network device or a collection of network devices. For example, access point 220 may include a modem, router, a switch, a gateway, a hub, a cellular antenna, or some other type of network device. In some implementations, access point 220 may connect with one or more adjacent devices (e.g., access points 220 and/or connection points 230). In some implementations, access point 220 may store a table that identifies a path to connection point 230 in order to access an external network (e.g., via multiple adjacent access points 220). In some implementations, access point 220 may include an identifier (ID) that may be broadcasted to adjacent access points 220 and may be stored by an adjacent device table to identify access point 220. In some implementations, access point 220 may access the external network to transmit data flows to/from an associated client device 210.

In some implementations, access point 220 may be included as part of client device 210. That is, descriptions of access point 220 may refer to a component of client device 210 that functions as an access point 220 (e.g., a component that transmits data gathered by one or more sensors of client device 210 and/or a component that transmits a data flow to an application, a repository, or some other component of client device 210). Alternatively, access point 220 may be a device external to client device 210 and may transmit data flows to/from client device 210 and/or to/from some other source.

Connection point 230 may include a network device or a collection of network devices. For example, connection point 230 may include a modem, a router, a switch, a gateway, a hub, a cellular antenna, or some other type of network device. In some implementations, connection point 230 may connect access point 220 to an external network. In some implementations, connection point 230 may enforce transmission policies (e.g., QoS policies or the like) that identify how data flows, transmitted via connection point 230, is to be treated.

In some implementations, access point 220 may also function as connection point 230. That is, access point 220 may access an external network.

Provisioning server 240 may include a computing device, such as a server device or a collection of server devices. In some implementations, provisioning server 240 may provision access point 220 to prepare access point 220 to process and/or transmit data flows in a particular manner. For example, provisioning server 240 may install an application on access point 220 and/or provide instructions that direct access point 220 to select a particular connection point 230 to which to transmit a data flow (e.g., based on a class of the data flow). Additionally, or alternatively, provisioning server 240 may provide some other information to prepare access point 220 to transmit data flows. In some implementations, provisioning server 240 may concurrently provision multiple access points 220, for example, when the multiple access points 220 connect to connection point 230 in order to connect with provisioning server 240 via an external network. As a result, the multiple access points 220 may be concurrently provisioned based on connecting with provisioning server 240 such that the multiple access points 220 may not need to be manually and/or separately provisioned.

Selection gateway 250 may include a network device or a collection of network devices. For example, selection gateway 250 may include a modem, a router, a switch, a gateway, a hub, or some other type of network device. In some implementations, selection gateway 250 may receive a data flow destined for access point 220 and may select a particular connection point 230 via which to transmit the data flow. For example, selection gateway 250 may select the particular connection point 230 based on a measure of network load associated with the particular connection point 230, based on a class of the data flow, and/or based on some other factor.

Service provider network 260 may include one or more wired and/or wireless networks via which connection points 230 provide access to external network 270. For example, service provider network 260 may include a cellular network (e.g., a second generation (2G) network, a third generation (3G) network, a fourth generation (4G) network (e.g., a long term evolution (LTE) network), a fifth generation (5G) network, or the like) the Public Land Mobile Network (PLMN), network, and/or another type of network. Additionally, or alternatively, service provider network 260 may include a local area network (LAN), wide area network (WAN), a metropolitan area network (MAN), an ad hoc network, an intranet, virtual private network (VPN), a fiber optic-based network, and/or a combination of these or other types of networks. In some implementations, service provider network 260 may include one or more network devices to provide connectivity to service provider network 260. For example, service provider network 260 may include an eNodeB (eNB) device, serving gateway (SGW), a packet data network (PDN) gateway (PGW), and/or some other network device.

External network 270 may include one or more wired and/or wireless networks. For example, external network 270 may include a cellular network, (e.g., a 2G network, a 3G network, a 4G network an LTE) network a 5G network, or the like). Additionally, or alternatively, external network 270 may include a LAN, a WAN, a MAN, a telephone network (e.g., the Public Switched Telephone Network (PSTN)), an ad hoc network, a managed IP network, a VPN, an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections. In some implementations, client device 210, access point 220, and/or connection point 230 may be associated with a common local network and may be geographically distributed.

Figure 3:
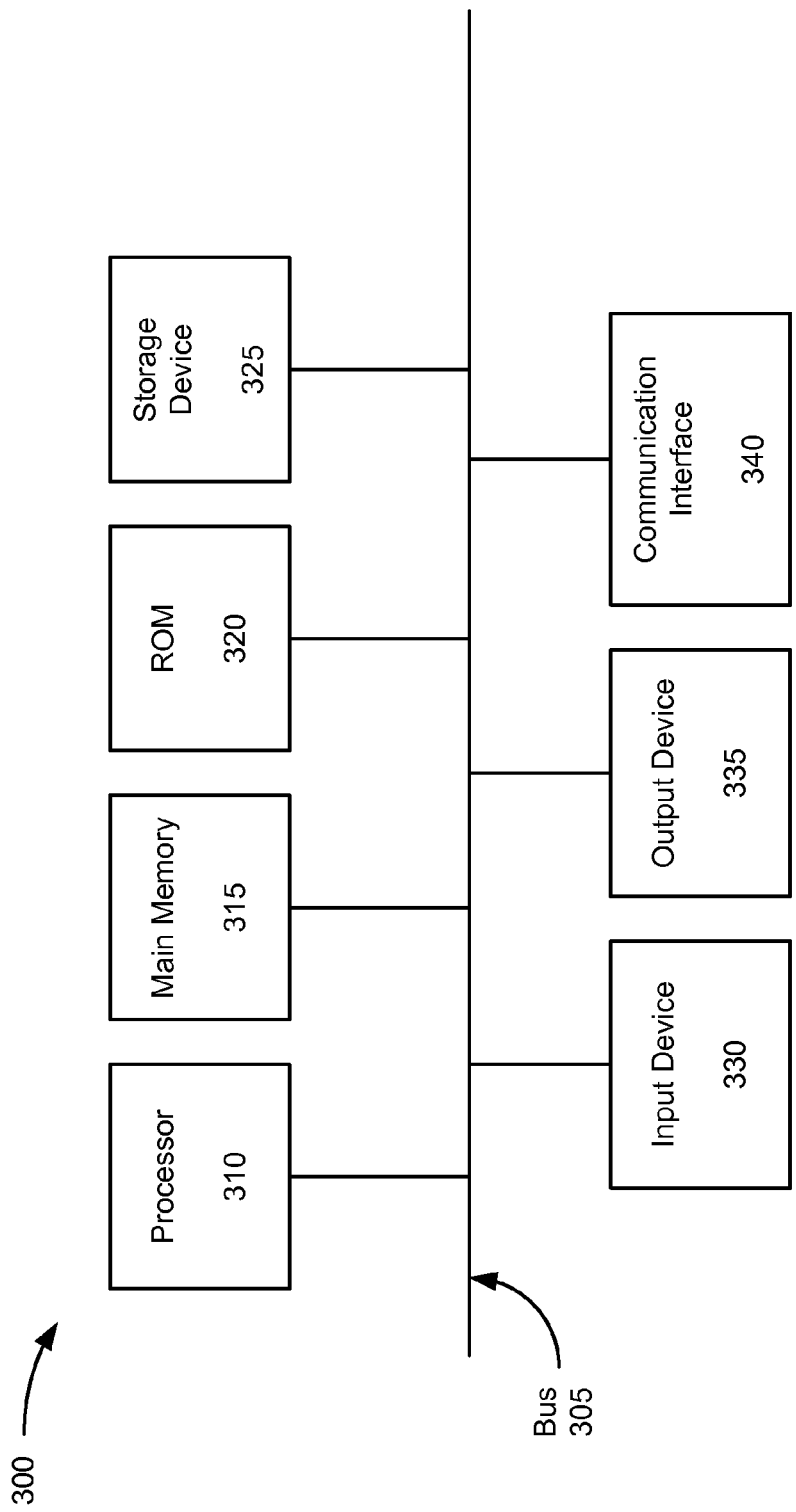
FIG. 3 illustrates example components of a device that may be used within the environment of FIG. 2.

FIG. 3 illustrates example components of a device 300 that may be used within environment 200 of FIG. 2. Device 300 may correspond to client device 210, access point 220, connection point 230, provisioning server 240, and/or selection gateway 250. Each of client device 210, access point 220, connection point 230, provisioning server 240, and/or selection gateway 250 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
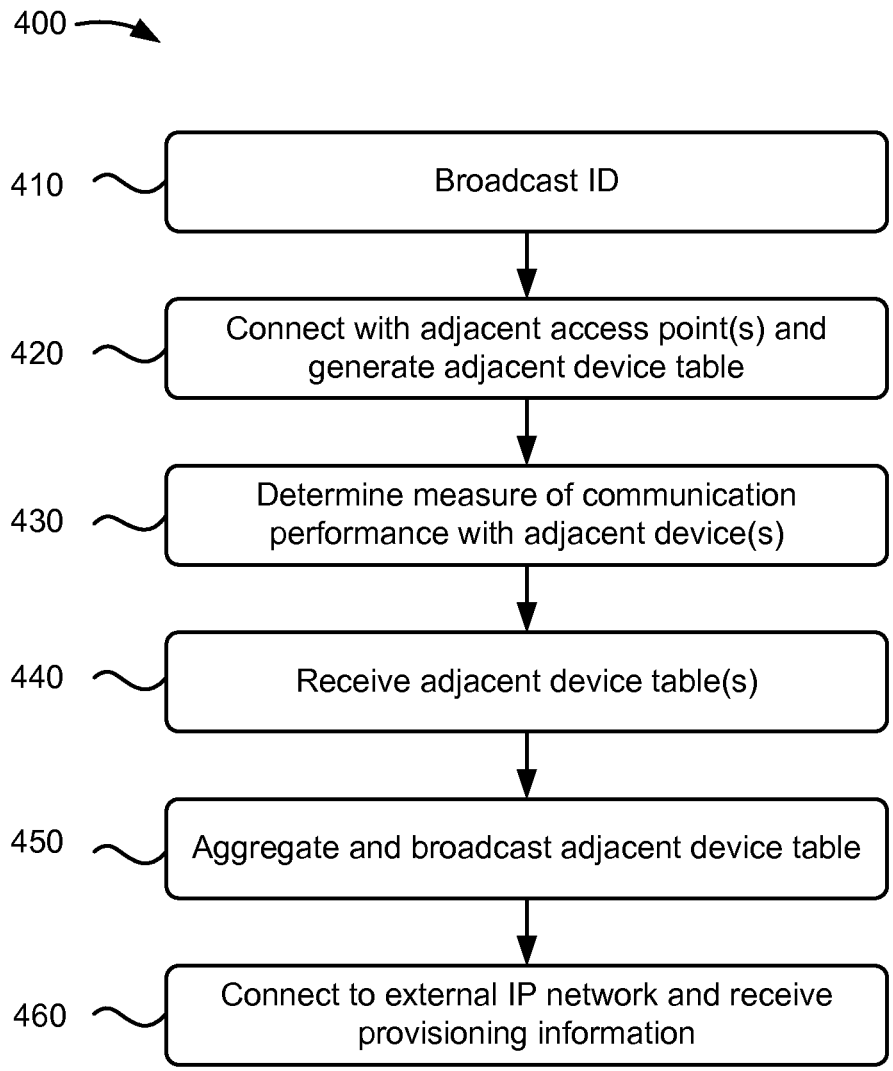
FIG. 4 illustrates a flowchart of an example process for generating and updating an adjacent device table to discover a path to an external network.

FIG. 4 illustrates a flowchart of an example process 400 for generating and updating an adjacent device table to discover a path to an external network. In some implementations, process 400 may be performed by one or more components of access point 220. In some implementations, some or all of blocks of process 400 may be performed by one or more components of another device in environment 200 (e.g., client device 210, connection point 230, provisioning server 240, and/or selection gateway 250), or a group of devices including or excluding access point 220. In FIG. 4, assume that a first access point 220 (e.g., access point 220-1) is adjacent to a second access point 220 (e.g., access point 220-2) and that access point 220-2 is adjacent to connection point 230. Further, assume that access point 220-1, access point 220-2, and connection point 230 are associated with a common local network.

As shown in FIG. 4, process 400 may include broadcasting an ID (block 410). For example, access point 220-1 may broadcast an ID that identifies access point 220-1 when access point 220-1 is powered on and/or when access point 220-1 detects an adjacent device (e.g., access point 220-2). In some implementations, access point 220-1 may broadcast the ID to allow access point 220-2 to identify that access point 220-1 is adjacent to access point 220-2 (e.g., within connection range of access point 220-2). In some implementations, access point 220-2 may also broadcast an ID that identifies access point 220-2 such that access point 220-1 may identify access point 220-2 as an adjacent device (e.g., when access point 220-1 is within connection range of access point 220-2). In some implementations, connection point 230 may broadcast an ID that identifies connection point 230 such that an access point 220 may identify connection point 230 as an adjacent device.

Process 400 may also include connecting with adjacent access point(s) and generating an adjacent device table (block 420). For example, access point 220-1 may connect with access point 220-2 based on identifying the ID of access point 220-2 (e.g., when access point 220-1 is adjacent to access point 220-2). In some implementations, access point 220-1 may connect with multiple adjacent access points 220 when respective IDs of the multiple adjacent access points 220 are identified by access point 220-1. In some implementations, access point 220-1 may generate an adjacent device table (referred to in FIG. 4 as a first table) and may store information in the first table regarding devices adjacent to access point 220-1 (e.g., access points 220 and/or connection points 230). As described in greater detail below, an adjacent device table may identify one or more devices that are adjacent to a particular access point 220. Additionally, the adjacent device table may identify a path from the particular access point 220 to an external network (e.g., via adjacent devices). In some implementations, the adjacent device table may identify a measure of communication performance between the particular access point 220 and an adjacent access point 220 and/or an adjacent connection point 230.

Process 400 may also include determining measure of communication performance with adjacent device(s) (block 430). For example, access point 220-1 may perform communication performance tests with access point 220-2, such as ping test, a loop-back test, and/or some other type of test to determine a measure of communication performance. In some implementations, the measure of communication performance may include a latency value, a jitter value, a bit rate value, and/or some other value.

In some implementations, access point 220-1 may receive communication performance measurements from access point 220-2 without performing the communication performance tests. For example, access point 220-2 may provide predetermined communication performance measurements. In some implementations, the predetermined communication performance measurements may be based on a type of connection interface associated with a connection between access point 220-1 and access point 220-2. For example, the predetermined communication performance measurements may be different when access point 220-1 connects with access point 220-2 via a ZigBee connection than when access point 220-1 connects with access point 220-2 via a Bluetooth connection. In some implementations, access point 220-1 may store the measure of communication performance in the first table.

Process 400 may further include receiving adjacent device table(s) (block 440). For example, access point 220-1 may receive an adjacent device table from access point 220-2 (referred to in FIG. 4 as a second table). Additionally, access point 220-1 may receive adjacent device tables from other devices that are adjacent to access point 220-1 (e.g., adjacent access points 220 and/or adjacent connection points 230). In FIG. 4, assume that only access point 220-2 is adjacent to access point 220-1.

Process 400 may further include aggregating adjacent device tables (block 450). For example, access point 220-1 may aggregate the adjacent device table, received from access point 220-2 (i.e., the second table), with the adjacent device table generated by access point 220-1 (i.e., the first table). Based on aggregating the first table and the second table, the first table may include information associated with devices adjacent to access point 220-1 and devices adjacent to access point 220-2 (e.g., device identifiers, communication performance measurements, network paths, etc.). In some implementations, the first table may include information that identifies a path from access point 220-1 to connection point 230 such that access point 220-1 may connect with an external network.

As an example, assume that the second table identifies that access point 220-2 is adjacent to connection point 230. Given this assumption, and based on aggregating the first table and the second table, the first table may include information to identify that access point 220-2 is adjacent to connection point 230. Further, since access point 220-1 is adjacent to access point 220-2, the first table may identify a path from access point 220-1 to connection point 230 (e.g., via access point 220-2) such that access point 220-1 may connect to an external network.

In some implementations, blocks 410-450 may be repeated such that updates to adjacent device tables may be aggregated and such that the first table may include up-to-date information. For example, block 410-450 may be repeated every 5 seconds, every 10 seconds, every 30 seconds, or at some other recurring interval. In some implementations, blocks 410-450 may repeated when access point 220-1 detects a new adjacent device (e.g., an adjacent device that enters connection range of 220-1) or when access point 220-1 detects that a previously connected adjacent device is disconnected. In some implementations, blocks 410-450 may be repeated for a particular number of iterations such that an entire view of the common local network, associated with access point 220-1, access point 220-2, and connection point 230, can be determined.

Process 400 may also include connecting to an external network and receive provisioning information (block 460). For example, access point 220-1 may connect with the external network by connecting with connection point 230 (e.g., via a connection path that includes access point 220-2 and/or some other access point 220). Based on connecting to the external network, provisioning server 240 may provide provisioning information to access point 220-1 to prepare access point 220-1 to provide data flows. In some implementations, the provisioning information may include one or more processing applications that access point 220-1 may install to process data gathered by a particular client device 210 associated with access point 220-1 (e.g., a client device 210 that includes access point 220-1 as an integrated component or a client device 210 that is external to access point 220-1 and connected to access point 220-1 via a wired or wireless connection). In some implementations, the processing application may be installed on access point 220-1 and/or client device 210.

Additionally, or alternatively, the provisioning information may include selection instructions that instruct access point 220-1 to select a particular connection point 230, of multiple connection points 230, when transmitting a data flow. For example, as described above, access point 220-1 may select a particular connection point 230 based on a class of the data flow and/or based on some other factor.

Additionally, or alternatively, the provisioning information may include a transmission instruction to direct access point 220-1 to provide a data flow at a particular time or to provide an alert when data, gathered by an associated client device 210, satisfies a particular threshold. As an example, assume that client device 210 includes a metering device to gather usage data of a particular resource (e.g., energy usage, or the like). In some implementations, the provisioning information may include a transmission instruction that directs access point 220-1 to provide the usage data at particular intervals and times (e.g., once an hour, once a day, once a week, etc.) and/or to provide an alert when the usage data satisfies a particular threshold (e.g., when the usage data exceeds a particular threshold).

In some implementations, provisioning server 240 may provide the provisioning information based on receiving status information from access point 220-1 that identifies that access point 220-1 is in need of receiving the provisioning information. For example, provisioning server 240 may provide the provisioning information when access point 220-1 does not include a selection instruction, a processing application, and/or a transmission instruction for a corresponding client device 210. In some implementations, provisioning server 240 may provide the provisioning information when the selection instruction, the processing application, and/or the transmission instruction are out of date (e.g., in relation to a version number, an expiration date, or the like). In some implementations, access point 220-1 may provide the status information as part of an initial set-up of access point 220-1 and/or when access point 220-1 is powered on. Additionally, or alternatively, access point 220-1 may periodically provide the status information so that access point 220-1 can receive up-to-date provisioning information.

In some implementations, multiple access points 220 may receive provisioning information from provisioning server 240 when connecting to the external network. As a result, the multiple access points 220 may be provisioned once connected to the external network without the need to separately provision each access point 220. That is, the provisioning information may be provided to particular access points 220 as those particular access points 220 connect to the external network (e.g., via a connection path to connection point 230). In some implementations, provisioning server 240 may multicast the provisioning information to multiple access points 220 such that the multiple access points 220 may be concurrently provisioned.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel. Also, in some implementations, some of the blocks may be omitted.

While FIG. 4 illustrates an example where only access point 220-2 is adjacent to access point 220-1, in practice, process 400 may apply when a particular access point 220 is adjacent to any number of access points 220 and/or connection points 230. For example, assume that access point 220-1 is adjacent to access point 220-2. Further, assume that access point 220-2 is adjacent to access point 220-3. Given these assumptions, access point 220-2 may connect with access point 220-3, receive an adjacent device table from access point 220-3, determine a measure of communication performance with access point 220-3, and aggregate an adjacent device table generated by access point 220-2.

As another example, assume that access point 220-1 is adjacent to access point 220-2 and access point 220-3. Give these assumptions, access point 220-1 may connect with access point 220-2 and access point 220-3, generate an adjacent device table that identifies access point 220-2 and access point 220-3, receive adjacent device tables from access point 220-2 and access point 220-3, determine a measure of communication performance with access point 220-2 and a measure of communication performance with access point 220-3, and aggregate the adjacent device tables of access point 220-2 and access point 220-3 with the adjacent device table of access point 220-1. In practice, other examples are possible than what is described above.

FIG. 5 illustrates an example data structure 500 that may be stored by one or more devices in environment 200, such as access point 220. In some implementations, data structure 500 may be stored in a memory of access point 220. In some implementations, data structure 500 may be stored in a memory separate from, but accessible by, access point 220. In some implementations, data structure 500 may be stored by some other device in environment 200, such as client device 210, connection point 230, provisioning server 240, and/or selection gateway 250.

A particular instance of data structure 500 may contain different information and/or fields than another instance of data structure 500. In some implementations, one instance of data structure 500 may include adjacent device tables for a particular access point 220 and/or a particular connection point 230. Another instance of data structure 500 may include adjacent device tables for another access point 220 and/or another connection point 230.

As shown in FIG. 5, data structure 500 may include adjacent device information field 510, aggregate adjacent device information field 520, path table field 530, and/or connection point selection field 540.

Adjacent device information field 510 may store information identifying devices adjacent to a particular access point 220 or a particular connection point 230. In the example of FIG. 5, adjacent device information field 510 may store information identifying devices adjacent to the particular access point 220, such as the particular access point 220 having the device ID "AP-1." In FIG. 5, assume that an access point 220 having the device ID "AP-2" and that an access point 220 having the device ID "AP-5" are adjacent to the access point 220 having the device ID "AP-1." Given these assumptions, adjacent device information field 510 may store a list that includes the device ID "AP-2" and the device ID "AP-5." As further shown in FIG. 5, adjacent device information field 510 may store performance measurements associated with AP-2 and AP-5. For example, adjacent device information field 510 may store latency values and bandwidth values (e.g., bit rate values) corresponding to communication performance measurements between AP-1 and AP-2 and AP-1 and AP-5.

In some implementations, the performance measurements, stored by adjacent device information field 510, may be based on performance tests performed between AP-1 and AP-2, and AP-1 and AP-5 (e.g., in a similar manner as described above with respect to block 440). In the example of FIG. 5, adjacent device information field 510 may store a latency value of 50 milliseconds (ms) and a bandwidth value of 2 megabits per second (Mbps) corresponding to performance measurements for communication between AP-1 and AP-2. In some implementations, adjacent device information field 510 may store other communication performance measurements, such as a signal strength, a jitter value, or the like.

Aggregate adjacent device information field 520 may store information received from devices adjacent to AP-1. For example, AP-1 may receive information stored by adjacent device information field 510, associated with devices adjacent to AP-1 (e.g., AP-2 and AP-5), and may aggregate the information stored by the adjacent device information field 510 of AP-2 and the adjacent device information field 510 of AP-5. In some implementations, aggregate adjacent device information field 520 may store information regarding devices adjacent to AP-1 (e.g., AP -2 and AP-5). Further, aggregate adjacent device information field 520 may store information regarding devices adjacent to the devices adjacent to AP-1 (e.g., devices adjacent to AP-2 and AP-5), and so on.

As an example, assume that AP-1 is adjacent to AP-2 and AP-5. Further, assume that AP-2 is adjacent to AP-3 and AP-4. Further, assume that AP-3 is adjacent to CP-1 (e.g., a connection point 230 having the device ID of "CP-1"). Further, assume that AP-4 is adjacent to CP-2 and to AP-5. Further, assume that AP-5 is adjacent AP-1. Given these assumptions, aggregate adjacent device information field 520 may store information that identifies that AP-1 is adjacent to AP-2 and AP-5. For example, aggregate adjacent device information field 520 may store an entry having "AP-1" listed under the "origin" field and "AP-2" listed under the "adjacent device" field. Also, aggregate adjacent device information field 520 may store another entry having AP-1" listed under the "origin" field and "AP-5" listed under the "adjacent device" field.

As further shown in FIG. 5, aggregate adjacent device information field 520 may store information that identifies that AP-2 is adjacent to AP-4 and AP-3. Further, aggregate adjacent device information field 520 may store information that identifies that AP-3 is adjacent to CP-1, that AP-4 is adjacent to CP-2 and AP-5, and that AP-5 is adjacent to CP-1. In some implementations, aggregate adjacent device information field 520 may store communication performance measurements for each origin device and corresponding adjacent device.

Path table field 530 may store information identifying paths from an origin device to a destination device. In some implementations, information stored by path table field 530 may be based on information stored by adjacent device information field 510 and/or aggregate adjacent device information field 520. As an example in connection with the examples of adjacent device information field 510 and aggregate adjacent device information field 520 described above, assume that AP-1 may access an external network via CP-1 and that AP-1 may connect to CP-1 via AP-2 and AP-3. For example, as shown in aggregate adjacent device information field 520, AP-1 may be adjacent to AP-2. AP-2 may be adjacent to AP-3, and AP-3 may be adjacent to CP-1. Thus, given the information stored by aggregate adjacent device information field 520, path table field 530 may store information that identifies a path between AP-1 (e.g., an origin), to a destination (e.g., CP-1), such as the path "AP-2, AP-3, CP-1." In some implementations, path table field 530 may store information identifying local IP addresses of AP-2 and AP-3. In some implementations, path table field 530 may store information identifying an external IP address associated with a particular connection point 230.

In some implementations, path table field 530 may store communication performance measurements associated with a particular path. For example, path table field 530 may store a path latency value, a path bandwidth value, and/or some other value relating to the communication performance of the particular path. In some implementations, the path latency may be the sum of latencies associated with devices associated with the particular path. As an example, the path latency value of the path from AP-1 to CP-1 (e.g., 270 ms) may include the sum of the latency between AP-1 and AP-2 (e.g., 50 ms), the latency between AP-2 and AP-3 (e.g., 200 ms), and the latency between AP-3 and CP-1 (e.g., 20 ms). In some implementations, the path bandwidth value of the path from AP-1 to CP-1 (e.g., 1.5 Mbps) may include the lowest bandwidth between devices in the path (e.g., the bandwidth between AP-2 to AP-3). In some implementations, AP-1 may perform a communication performance test with CP-1 to determine the performance measurements of the path.

As shown in FIG. 5, path table field 530 may store information regarding multiple paths for a particular origin and a particular destination. For example, path table field 530 may store information regarding multiple paths between AP-1 and CP-1. In some implementations, data flows may be transmitted via a particular path based on the communication performance measurements associated with each path. For example, data flows may be transmitted via a path associated with lower latencies, higher bandwidths, etc.

As shown in FIG. 5, path table field 530 may store information identifying paths from a particular access point 220 to a particular connection point 230. Additionally, or alternatively, path table field 530 may store information identifying paths from a particular access point 220 to another access point 220. In some implementations, information stored by path table field 530 may be updated as new paths become available (e.g., when additional access points 220 and/or connection points 230 are added or otherwise become available) or as existing paths become unavailable (e.g., when an access point and/or a connection point 230 fails or otherwise become unavailable).

Connection point selection field 540 may include information identifying selection rules that identify a particular connection point 230 that may be selected to transmit data flows to provide to/from a particular access point 220 (e.g., a particular access point 220 identified by a device ID stored by connection point selection field 540). For example, connection point selection field 540 may identify that data flows of particular classes are to be transmitted via particular connection points 230. As described above, different connection points 230 may enforce different policies that correspond to different levels of network resources (e.g., bearers that provide particular latencies, bit rates, priority levels, etc.). For example, class 1 data flows may be transmitted via a different connection point 230 than a class 2 data flow such that the class 1 data flow is provided with a different level of network resources than class 2 data flows and/or such that class 1 data is transmitted at a higher priority than class 2 data flows.

As an example, assume that a class 1 data flow corresponds to video class data flows and that a class 2 data flow corresponds to text class data flows. Further, assume that a lower level of network resources are needed to transmit the class 2 data flow than the class 1 data flow. Given these assumptions, the class 1 data flow may be transmitted via a particular connection point 230 (e.g., connection point 230-1) that provides a greater level of network resources than another connection point 230 that transmits class 2 data flows (e.g., connection point 230-2). For example, connection point 230-1 may transmit the class 1 data flow via a bearer that provides lower latencies and higher bit rates than a bearer associated with connection point 230-2. In some implementations, the class of the data flow may be determined based on information stored by a header of one or more packets associated with the data flow. Additionally, or alternatively, the class of the data flow may be determined based on some other technique.

In some implementations, connection point selection field 540 may store some other selection rule to identify a particular connection point 230 that may be selected to transmit a data flow. For example, connection point selection field 540 may identify that the particular connection point 230 may be selected based on a measure of network load (e.g., a measurement corresponding to performance measurements for a path between the particular connection point 230 and a destined access point 220). Additionally, or alternatively, connection point selection field 540 may identify that the particular connection point 230 may be selected based on a subscription level associated with the data flow (e.g., a subscription level of a recipient or sender of the data flow).

As described in greater detail below, access point 220 may select a particular connection point 230 (e.g., when providing a data flow) based on information stored by connection point selection field 540. Additionally, or alternatively, selection gateway 250 may select a particular connection point 230

(e.g., when providing a data flow towards access point 220) based on information stored by connection point selection field 540.

While particular fields are shown in a particular format in data structure 500, in practice, data structure 500 may include additional fields, fewer fields, different fields, or differently arranged fields than are shown in FIG. 5. Also, information stored by data structure 500 are shown as merely examples. In practice, other examples of information stored by data structure 500 are possible.

Figure 6:
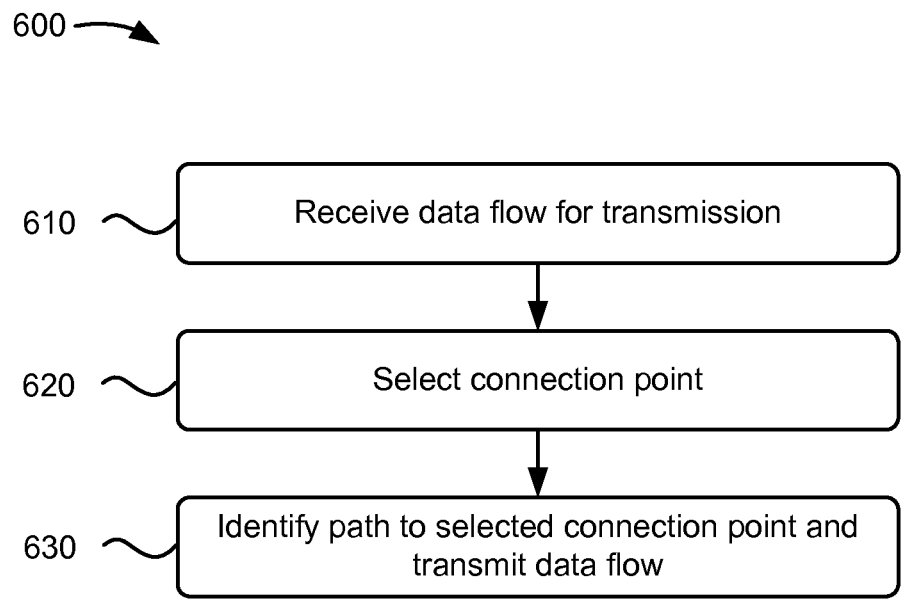
FIG. 6 illustrates a flowchart of an example process for selecting a particular connection point and providing a data flow via the particular connection point.

FIG. 6 illustrates a flowchart of an example process for selecting a particular connection point and providing a data flow via the particular connection point. In one implementation, process 600 may be performed by one or more components of access point 220 and/or selection gateway 250. In another implementation, some or all of blocks of process 600 may be performed by one or more components of another device in environment 200 (e.g., client device 210 and/or provisioning server 240), or a group of devices including or excluding access point 220 and/or selection gateway 250.

As shown in FIG. 6, process 600 may include receiving a data flow for transmission (block 610). For an outbound data flow (e.g., for a data flow provided from access point 220 to be transmitted via an external network), access point 220 may receive the data flow for transmission from a client device 210 associated with access point 220 (e.g., a data flow including data gathered by client device 210). For an inbound data flow (e.g., for a data flow received from the external network and destined for access point 220), selection gateway 250 may receive the data flow from the external network. In some implementations, the data flow may include a request to transmit the data flow to a destination device (e.g., based an IP address associated with the destination device).

Process 600 may further include selecting a connection point (block 620). For example, as described above with respect to connection point selection field 540, access point 220 and/or selection gateway 250 may select a particular connection point 230, of multiple connection points 230, based on a device ID of access point 220, based on a class associated with the data flow, based on network load measurements associated with the multiple connection points 230, and/or based on some other factor. In some implementations, connection points 230 may broadcast network load measurements such that a particular connection point 230, having the least amount of network load, may be selected. In some implementations, the factors used to select the particular connection point 230 may be weighted. For example, the class of the data flow may be weighted higher than the measure of the network load. Alternatively, the measure of the network load may be weighted higher than the class of the data flow.

Process 600 may also include identifying a path to the selected connection point and transmitting the data flow (block 630). For example (e.g., for an outbound data flow), access point 220 may identify a path to the selected connection point 230 based on information stored by path table field 530. As described above, path table field 530 may store information identifying multiple paths to a particular connection point 230. In some implementations, access point 220 may select a particular path, of multiple paths, based on path latency values, path bandwidth values, etc. For an inbound data flow, selection gateway 250 may provide the data flow to the selected connection point 230 and direct the selected connection point 230 to provide the data flow to access point 220 (e.g., via a path identified by path table field 530). In some implementations, the data flow may be provided to the selected connection point 230 via an IP address associated with the selected connection point 230.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel. Also, in some implementations, some of the blocks may be omitted.

While FIG. 6 describes selection gateway 250 as selecting a particular connection point 230 to provide an inbound data flow to access point 220, in practice, a sender of the data flow (e.g., a sending client device 210) may select the particular connection point 230. For example, information stored by connection point selection field 540 may be broadcasted such that the sending client device 210 may receive the information stored by connection point selection field 540 and may select the particular connection point 230 based on the information stored by connection point selection field 540. Once the particular connection point 230 has been selected, the sending client device 210 may provide the data flow to the particular connection point 230 without involving selection gateway 250.

Figure 7:
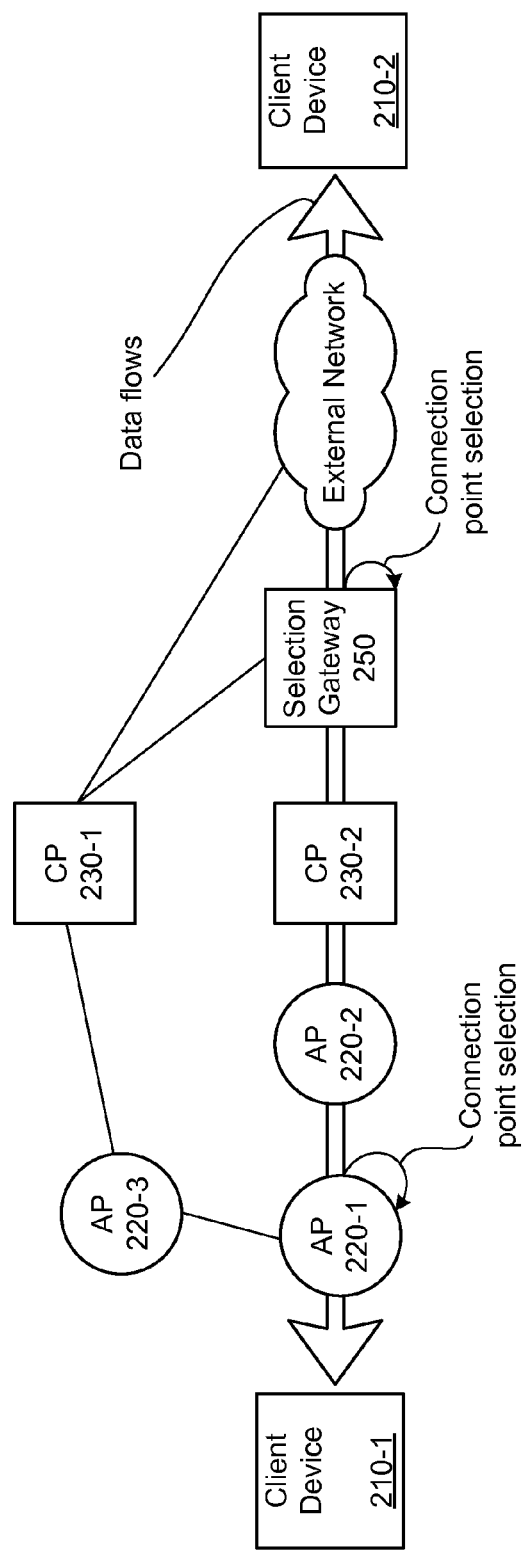
FIG. 7 illustrates an example implementation as described herein.

FIG. 7 illustrates an example implementation as described herein. In FIG. 7, assume that a first client device 210 (e.g., client device 210-1) communicates with a second client device 210 (e.g., client device 210-2) over an external network. Further, assume that client device 210-1 connects with access point 220-1 to transmit and receive data flows. For example, access point 220-1 may be integrated within client device 210-1. Alternatively, access point 220-1 may be external to client device 210-1 and connected to client device 210-1 via a wired or wireless connection. Further, assume that access point 220-1 is adjacent to access point 220-2 and adjacent to access point 220-3. Further, assume that access point 220-3 is adjacent to connection point 230-1 and that access point 220-2 is adjacent to connection point 230-2.

In some implementations, access point 220-1 may receive a data flow (e.g., a data flow having data gathered by client device 210-1) and may receive an instruction to transmit the data flow towards client device 210-2 (e.g., based on receiving a request for the data flow from client device 210-2, based on a transmission instruction of client device 210-1 that directs client device 210-1 to provide the data flow at a particular time, based on a transmission instruction of client device 210-1 that directs client device 210-1 to provide the data flow when the data, gathered by client device 210-1, satisfies a particular threshold, etc.). In some implementations (e.g., based on receiving the instruction to transmit the data flow), access point 220-1 may perform a connection point selection function (e.g., in accordance with block 620) to select a particular connection point 230 (e.g., connection point 230-1 or connection point 230-2) to access the external network to transmit the data flow. In FIG. 7, assume that access point 220-1 selects connection point 230-2 (e.g., based on a class of the data flow and/or based on some other factor). As shown in FIG. 7, the data flow may be transmitted from access point 220-1 towards client device 210-2 via access point 220-2, connection point 230-2, and the external network.

For an inbound data flow provided by client device 210-2 via the external network and destined for client device 210-1 (e.g., corresponding to access point 220-1), selection gateway 250 may receive the data flow and may select a particular connection point 230 via which to provide the data flow (e.g., as described above with respect to block 620). In FIG. 7, assume that selection gateway 250 selects connection point 230-2. Given this assumption, selection gateway 250 may provide the data flow towards access point 220-1 via connection point 230-2. In some implementations, connection point 230-2 may identify a path to access point 220-1 based on information stored by path table field 530. As a result, the data flow may be transmitted via the selected connection point 230 (e.g., the connection point 230 that provides network resources particular to the class of data flow) and may not be transmitted via another connection point 230 (e.g., a connection point 230 that provided insufficient or excess network resources to transmit the data flow). In some implementations, an unselected connection point 230 may transmit a data flow, for example, when the selected connection point 230 is unavailable (e.g., when the selected connection point 230 is overloaded, malfunctioning, or otherwise unavailable).

While a particular example is shown in FIG. 7, it will be apparent that the above description is merely an example implementation. Other examples are possible from what is described above with respect to FIG. 7.

Figure 8:
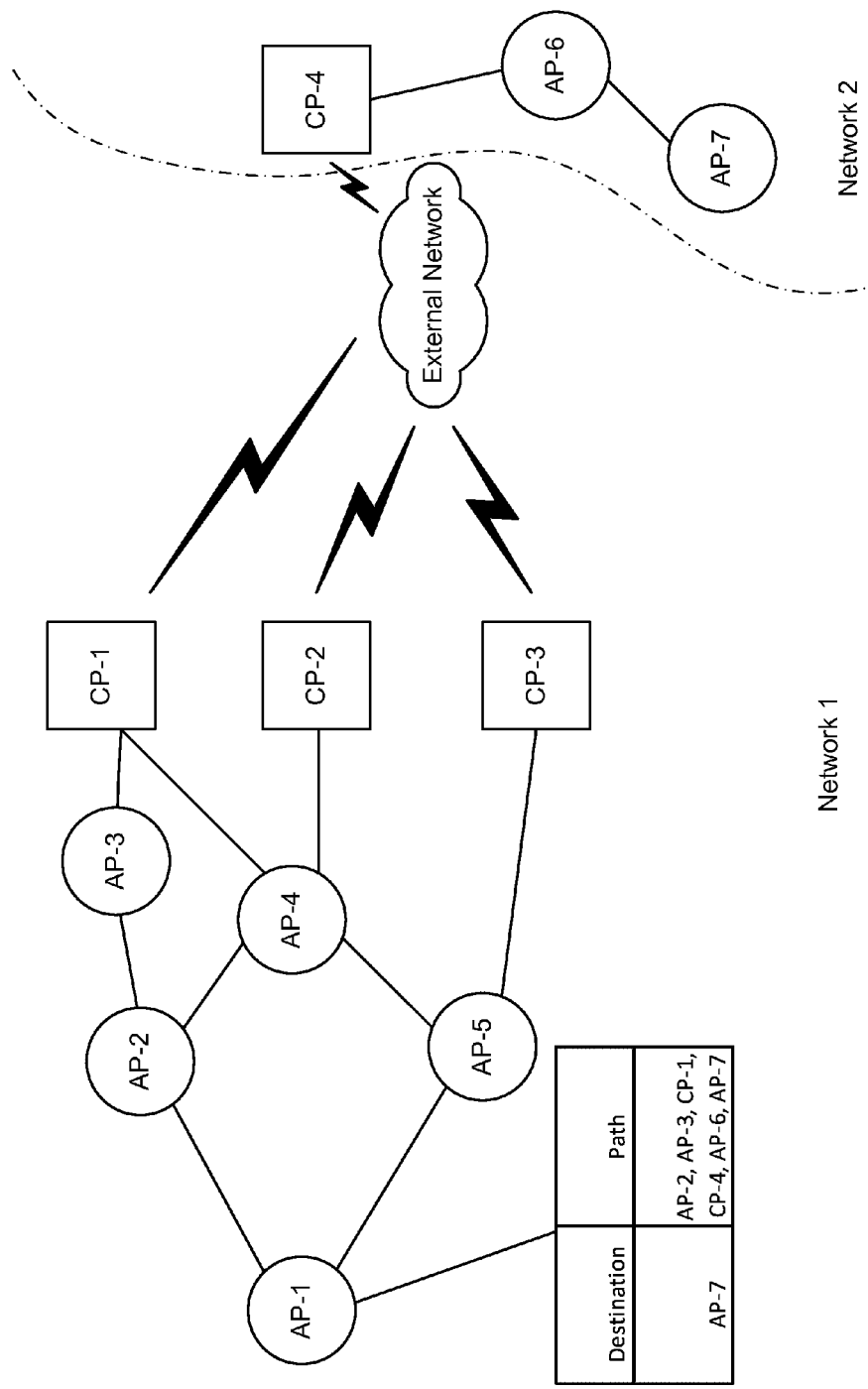
FIG. 8 illustrates an example implementation as described herein.

FIG. 8 illustrates an example implementation as described herein. As shown in FIG. 8, connection points 230 associated with a particular network (e.g., network 1) may communicate with connection points 230 in another network (e.g., network 2) via an external network. That is, a particular access point 220 of network 1 (e.g., AP-1) may communicate with an access point 220 of network 2 (e.g., AP-7). For example, as shown in FIG. 8, AP-1 may communicate with AP-7 via a path that includes AP-2, AP-3, CP-1, CP-4, AP-6, and AP-7. In some implementations, access points 220 and connection points 230 of different networks may be located in different geographic locations. As a result, adjacency between multiple access points 220 may be generated across multiple networks located in multiple geographic locations. For example, adjacency tables may be shared by access points 220 and connection points 230 associated with different network located in different geographic locations.

While a particular example is shown in FIG. 8, it will be apparent that the above description is merely an example implementation. Other examples are possible from what is described above with respect to FIG. 8.

As described above, a data flow may be transmitted via a particular connection point 230 associated with a particular transmission policy. Further, multiple access points 220 may transmit data flows at a lower cost than if each of the multiple access points accessed an external network directly. Also, multiple access points 220 and/or associated client devices 210 may be concurrently provisioned once connected to an external IP network, thereby reducing labor and other costs associated with separately provisioning potentially tens of thousands or millions of access points 220 and/or associated client devices 210.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
    receiving, by a first network device, an instruction to transmit a data flow;
    selecting, by the first network device, a particular one of one or more second network devices based on a selection rule, the one or more second network devices providing access to an external network;
    identifying, by the first network device, a path from the first network device to the particular one of the one or more second network devices from among a plurality of paths from the first network device to the particular one of the one or more second network devices,
    identifying the path being based on information that identifies the plurality of paths from the first network device to the particular one of the one or more second network devices,
    the path including one or more third network devices that are different from the first network device; and
    providing, by the first network device, the data flow to the particular one of the one or more second network devices via the path to cause the particular one of the one or more second network devices to transmit the data flow towards a destination device via the external network.

2. The method of claim 1, where the one or more third network devices are a same type of device as the first network device,
    where at least one of the one or more third network devices connects to the first network device when the at least one of the one or more third network devices is within a connection range of the first network device,
    where identifying the path includes generating a table that identifies the one or more third network devices.

3. The method of claim 1, where the first network device is included in a machine-to-machine device.

4. The method of claim 1, where receiving the instruction to transmit the data flow includes receiving the instruction to transmit the data flow from a machine-to-machine device that is external to the first network device.

5. The method of claim 1, where the selection rule relates to a particular policy associated with the one or more second network devices,
   where selecting the particular one of the one or more second network devices includes selecting the particular one of the one or more second network devices based on the particular policy.

6. The method of claim 1, where the selection rule relates to a class associated with the data flow,
   where selecting the particular one of the one or more second network devices includes selecting the particular one of the one or more second network devices based on the class associated with the data flow.

7. The method of claim 1, where the selection rule relates to a measure of network load associated with the one or more second network devices,
   where selecting the particular one of the one or more second network devices includes selecting the particular one of the one or more second network devices based on the measure of network load.

8. The method of claim 1, further comprising:
   receiving provisioning information based on connecting to the one or more second network devices,
      the provisioning information relating to the selection rule.

9. A system comprising: an access point to:
   receive an instruction to transmit a data flow;
   select a particular one of one or more connection points based on a selection rule, the one or more connection points providing access to an external network;
   identify a path from the access point to the particular one of the one or more connection points from among a plurality of paths from the access point to the particular one of the one or more connection points,
   identifying the path being based on information that identifies the plurality of paths from the access point to the particular one of the one or more connection points; and
   provide the data flow to the particular one of the one or more connection points via the path to cause the particular one of the one or more connection points to transmit the data flow towards a destination device,
   the particular one of the one or more connection points enforcing a particular policy when transmitting the data flow.

10. The system of claim 9, where the path includes one or more additional access points,
    where at least one of the one or more additional access points connects to the access point when the at least one of the one or more additional access points is within a connection range of the access point,
    where when identifying the path, the access point is further to generate a table that identifies the one or more additional access points.

11. The system of claim 9, where the access point is included in a machine-to-machine device.

12. The system of claim 9, where when receiving the instruction to transmit the data flow, the access point is further to receive the instruction to transmit the data flow from a machine-to-machine device that is external to the access point.

13. The system of claim 9, where the selection rule relates to a class associated with the data flow,
    where when selecting the particular one of the one or more connection points, the access point is further to select the particular one of the one or more connection points based on the class associated with the data flow.

14. The system of claim 9, where the selection rule relates to a measure of network load associated with the one or more connection points,
    where when selecting the particular one of the one or more connection points, the access point is further to select the particular one of the one or more connection points based on the measure of network load.

15. The system of claim 9, where the access point is further to:
    receive provisioning information based on connecting to the one or more connection points,
       the provisioning information relating to the selection rule.

16. A non-transitory computer-readable medium for storing instructions, the instructions comprising:
    a plurality of instructions which, when executed by one or more processors associated with a first network device, cause the one or more processors to:
    receive an instruction to transmit a data flow;
    select a particular one of one or more second network devices based on a selection rule,
    the one or more second network devices providing access to an external network;
    identify a path from the first network device to the particular one of the one or more second network devices from among a plurality of paths from the first network device to the particular one of the one or more second network devices,
    identifying the path being based on information that identifies the plurality of paths from the first network device to the particular one of the one or more second network devices,
    the path including one or more third network devices associated with a common local network and connected to the first network device; and
    provide the data flow to the particular one of the one or more second network devices via the path to cause the particular one of the one or more second network devices to transmit the data flow towards a destination device.

17. The non-transitory computer-readable medium of claim 16, where the first network device is included in a machine-to-machine device.

18. The non-transitory computer-readable medium of claim 16, where one or more instructions, of the plurality of instructions, to receive the instruction to transmit the data flow, further cause the one or more processors to receive the instruction to transmit the data flow from a client device that is external to the first network device.

19. The non-transitory computer-readable medium of claim 16, where the selection rule relates to a class associated with the data flow or a measure of network load associated with the one or more second network devices,
    where one or more instructions, of the plurality of instructions, to select the particular one of the one or more second network devices, further cause the one or more processors to select the particular one of the one or more second network devices based on the measure of network load.

20. The non-transitory computer-readable medium of claim 16, where the plurality of instructions further cause the one or more processors to:
    receive provisioning information based on connecting to the one or more second network devices,
    the provisioning information including the selection rule.

\* \* \* \* \*